United States Patent
Okuyama

(10) Patent No.: US 6,278,804 B1
(45) Date of Patent: Aug. 21, 2001

(54) IMAGE PROCESSING APPARATUS WITH SMOOTHING FEATURE

(75) Inventor: Hiroyuki Okuyama, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/982,045

(22) Filed: Dec. 1, 1997

(30) Foreign Application Priority Data

Nov. 29, 1996 (JP) .................................................. 8-319654

(51) Int. Cl.⁷ .............................. G06T 5/20; G06K 9/40; G06K 9/44; G06K 9/68
(52) U.S. Cl. .......................... 382/261; 382/264; 382/275; 382/218
(58) Field of Search ................................... 382/209, 217, 382/218, 219, 260, 264, 269, 261, 266, 275

(56) References Cited

U.S. PATENT DOCUMENTS

| | | | |
|---|---|---|---|
| 5,005,139 | * 4/1991 | Tung | 364/519 |
| 5,014,124 | 5/1991 | Fujisawa | 358/462 |
| 5,535,013 | * 7/1996 | Murata | 358/432 |
| 5,689,582 | * 11/1997 | Murakami | 382/176 |

FOREIGN PATENT DOCUMENTS

| | | | |
|---|---|---|---|
| 487 026 | 5/1992 | (EP) . | |
| 554 985 | 8/1993 | (EP) . | |
| 618 717 | 10/1994 | (EP) . | |
| 663 758 | 7/1995 | (EP) . | |
| 672 999 A1 | * 9/1995 | (EP) | G06T/11/20 |
| 7-57102 | 3/1995 | (JP) . | |

* cited by examiner

Primary Examiner—Scott Rogers
(74) Attorney, Agent, or Firm—Foley & Lardner

(57) ABSTRACT

A sampled image data in the form of a matrix is compared with each of the template image data provided in advance for matching and, if they are matched with each other, the coordinate values of the profile spots of each black image component of the sampled image data are determined. Then, the existence of any island-like region containing a set of several pixels (spots within a photograph region) in the sample image data is discriminated on the basis of the number of the profile spots and their correlations. If one or more than one island-like regions exist, the image having the island-like regions subjected to a smoothing operation is not selected but the image data A from the matrix forming section is selected. Thus, there is provided an image processing apparatus with which photograph regions are protected against any unnecessary smoothing operation to eliminate the risk of damaging the quality of the image.

12 Claims, 13 Drawing Sheets

| IMAGE REGION C2: CHARACTER/ PHOTOGRAPH | ISLAND C1: NON-EXISTENCE/ EXISTENCE | OUTPUT DATA A:SAMPLED DATA B:SMOOTHED DATA |
|---|---|---|
| 0 | 0 | A |
| 0 | 1 | A |
| 1 | 0 | A |
| 1 | 1 | B |

IMAGE PROCESSING APPARATUS WITH SMOOTHING FEATURE

BACKGROUND OF THE INVENTION

This invention relates to an image processing apparatus having a functional feature of smoothing the profile of an image. It also relates to an image processing method and to an image-forming apparatus realized by using such a method.

An image processing apparatus, which may be a copying machine, optically reads the original image and forms an electrostatic latent copy image of the original on a photosensitive dram, which operates as image carrier. Then, the electrostatic latent image is visualized by means of a developer and transferred onto a sheet of paper.

A smoothing technique is typically used for processing images in a copying machine. With this technique, the image is divided into a predetermined number of pixel blocks, which are sequentially sampled to produce a pixel matrix. The produced pixel matrix then provides sampled image data. Each of the sampled image data is then compared with a set of reference image data, which are also referred to template image data and contained in a look-up table that is stored in advance in the copying machine. If the sampled image data finds a matching reference data, data for black or white pixels are appropriately added to the profile of the black image that is represented by the sampled image data and expressed by the corresponding coordinate values in order to produce a smoothed profile that is free from jags.

FIG. 21 of the accompanying drawing illustrates the effect of a smoothing technique. Known smoothing methods include the one disclosed in Japanese Patent Application TOKKAI No. 7-57102.

While a smoothing technique may suitably be used on characters, it is not adapted to photographic images showing delicate tonal gradations because intermediate gradations are adversely affected by the smoothing effect to damage the quality of the copied image.

In order to cope with this problem, copying machines are currently adapted to discriminate character regions and photograph regions of images so that the photograph regions may be exempted from smoothing.

When an image is binarized by means of a pseudo-gradation technique such as error propagation, a very small island-like region comprising a set of black pixels and contained in a photograph region can often be mistaken for that of a character region.

Then, the photograph region is automatically subjected to a smoothing process to consequently damage the quality of the photograph.

More specifically, with error propagation, an intermediary gradation is expressed by the average of the gradations of a plurality of pixels (referred to as areal gradation). When a photograph region that has been processed by error propagation is smoothed, the gradation expressed by the average of the gradations of a plurality of pixels can be differentiated, if slightly, from the real gradation of the region to consequently damage the quality of the photograph. Such differentiation can result in a noise pattern of black spots appearing in intermediately gradated areas of an image as schematically illustrated in FIG. 22 of the accompanying drawings. As schematically illustrated in FIG. 23, such a black spot of a noise pattern is given rise to when one or more than one new pixels are added to a (photograph) region that is to be expressed by a predetermined number (four in FIG. 23) of pixels.

BRIEF SUMMARY OF THE INVENTION

In view of the above identified circumstances, it is therefore an object of the present invention to provide an image processing apparatus or an image-forming apparatus that reliably prevents any unnecessary smoothing operation from being conducted on the photograph region(s), if any, of the image being processed and hence any undesired degradation in the quality of the image from taking place.

Another object of the present invention is to provide an image processing method that reliably prevents any unnecessary smoothing operation from being conducted on the photograph region(s), if any, of the image being processed and hence any undesired degradation in the quality of the image from taking place.

In order to achieve the above objects, according to the invention, there is provided an image processing apparatus comprising means for smoothing the profile of an image constituted by image data, means for discriminating one or more than one specific regions, if any, each containing a set of pixels fewer than a predetermined number in the image on the basis of the number and the correlations of the profile spots of the image constituting the profile and means for determining whether a smoothing operation is to be performed by using the smoothing means in accordance with the outcome of the discriminating operation of the discriminating means.

Each of the specific regions containing a set of pixels fewer than a predetermined number is processed as a region within a picture image and no smoothing operation is conducted on it.

Preferably, an image processing apparatus according to the invention further comprises matrix forming means for forming a pixel matrix by sequentially sampling input image data and providing the image data of the pixel matrix as sampled image data and detecting means for detecting the profile of the black image component or each of the black component images, if any, from the sampled image data provided by the matrix forming means. The discriminating means includes means for discriminating one or more than one island-like regions (the specific region or regions), if any, having a surface area smaller than a predetermined value in the sampled image data when the number of profile spots of the black image component or each of the black image components detected by the detecting means is smaller than a predetermined value. The determining means includes image data switching means for selecting either the image data processed by the smoothing means or the sampled image data of the matrix forming means and producing the selected data as output.

Preferably, an image processing apparatus according to the invention further comprises image region determining means for determining the sampled image data provided by the matrix forming means are for a character region or a photographic region, wherein the data switching means selects the image processed by the smoothing means when the discriminating means does not discriminate any island-like region and the image region determining means determines that the sampled image data are for a character region and otherwise selects the sampled image data provided by the matrix forming means. With the above arrangement, no smoothing operation is conducted on a region determined to be a character region by the image region determining means if it is discriminated as an island-like region by the discriminating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 2:
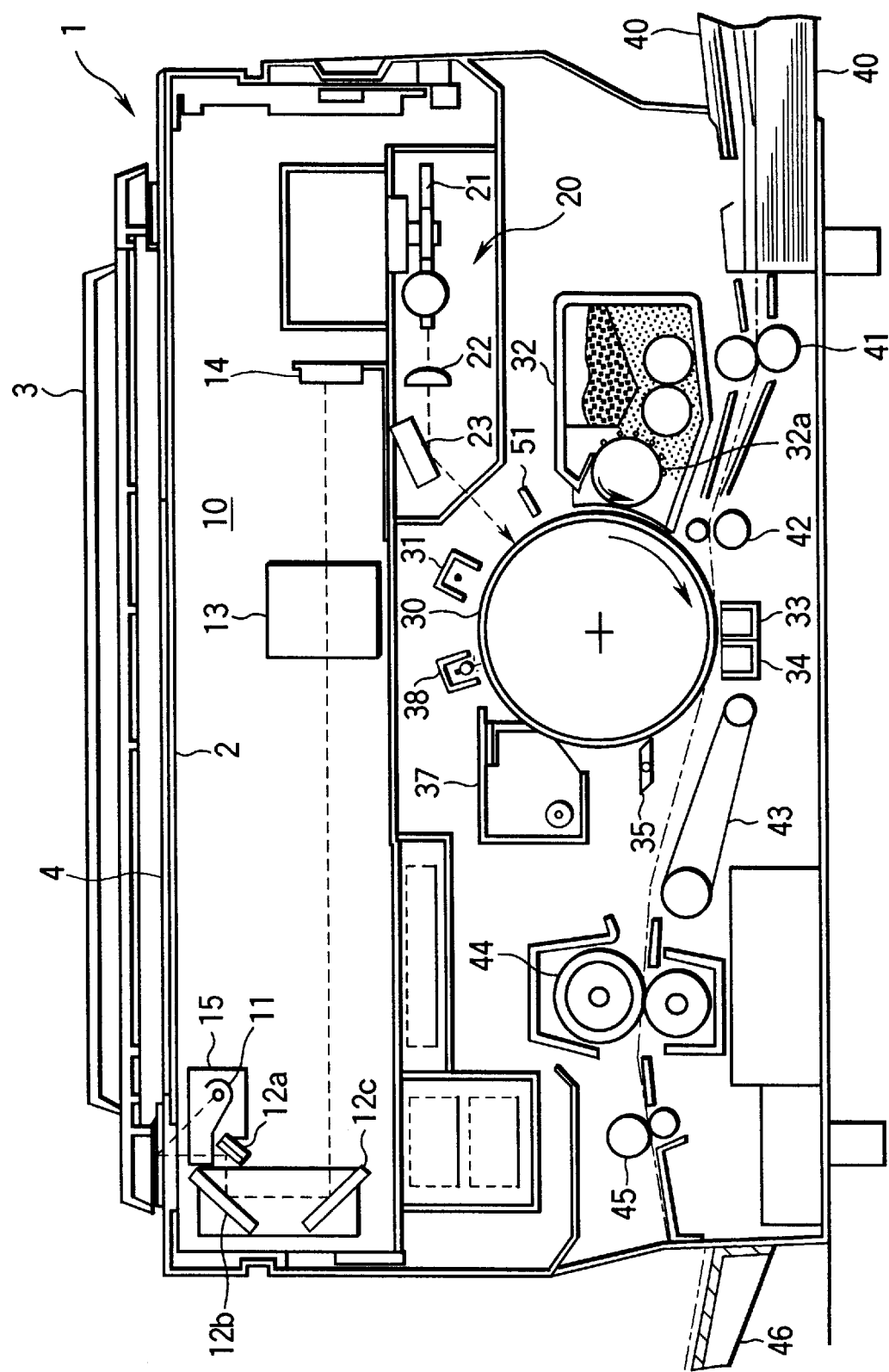
FIG. 2 is a schematic cross sectional side view of an image-forming apparatus according to the invention and showing the internal configuration.

Now, the present invention will be described by referring to the accompanying drawings that illustrate a preferred embodiments of the invention. FIG. 2 is a schematic cross sectional side view of an image-forming apparatus according to the invention and showing the internal configuration, which apparatus may be an electronic copying machine.

Referring to FIG. 2, it comprises a main body 1 and an original carrying table (a glass panel) 2 for carrying the original image to be copied and provided with a removable original carrying table cover 3 arranged on the original carrying table. An original is placed in position on the original carrying table 2.

An optical exposure system 10 is arranged in an upper area of the main body 1. The optical exposure system 10 comprises exposure means that may typically be an exposure lamp 11 arranged vis-a-vis and below the lower surface of the original carrying table 2, first through third reflection mirrors 12a, 12b, 12c, a variable magnification lens block 13 and an image signal output means that may typically be a CCD type line sensor (hereinafter referred to as CCD sensor) 14.

The exposure lamp 11 is adapted to reciprocatingly move back and forth as it is fitted to a carriage (CRG) 15 so that the entire surface of the original carrying table 2 may be exposed to and scanned by light emitted from the exposure lamp 11 as the carriage 15 reciprocatingly moves from left to right and vice versa in FIG. 2. A reflected optical image of the original 4 placed on the original carrying table 2 is obtained as a result of this exposure/scanning operation and projected onto the CCD sensor 14 by means of the reflection mirrors and the variable magnification lens block 13. The CCD sensor 14 transmits an image signal representing the image and corresponding to the amount of light it receives to a laser unit 20.

A photosensitive dram 30 that operates as an image carrier and is rotatable in the sense as indicated by the arrow in FIG. 2 is arranged in a central area of the main body 1. The photosensitive dram 30 is surrounded by an electric charger 31, the laser unit 20, a development unit 32, a transfer charger 33, a peeling charger 34, a peeling claw 35, a cleaner 37 and a deelectrification lamp 38 arranged in the above mentioned order.

The laser unit 20 includes a first lens for converging the laser beam emitted from a semiconductor laser device (not shown) and transforming it into a laser beam having a substantially circular cross section, a laser deflector 21 for deflecting the laser beam coming from the first lens into the direction of the axis of the photosensitive dram 30, a focusing lens 22 for coordinating the deflection angle of the laser beam and the distance between the optical axis on the photosensitive dram 30 and the focal point of the beam in order to focus the laser beam deflected by the laser deflector 21 on the photosensitive dram 30 and a mirror 23 for guiding the laser beam coming from the focusing lens 22 onto the photosensitive dram 30.

The electric charger 31 electrostatically charges the surface of the photosensitive dram 30 by applying a high voltage fed from a charging high voltage transformer (not shown) to the photosensitive dram 30 by means of a corona wire.

An electrostatic latent image is formed on the photosensitive dram 30 by the electric charge and the laser beam emitted from the laser unit 20 and focused on the photosensitive dram 30.

The development unit 32 contains a two-component developer comprising a non-magnetic toner substance and a magnetic carrier substance and includes a development roller 32a for feeding the developer to the photosensitive dram 30.

The development roller 32a holds the developer on the outer peripheral surface thereof and transfer only the negatively charged toner contained in it onto the electrostatic latent image formed on the photosensitive dram 30. The electrostatic latent image on the photosensitive dram 30 is visualized as the toner is transferred onto it. A developing bias voltage showing a predetermined voltage level is applied to the development roller 32a and the developer from a developing bias voltage generating circuit (not shown).

The development roller 32a comprises a magnet roller having the S-pole and the N-pole arranged peripherally and a non-magnetic sleeve adapted to rotate around the magnet roller in the sense of the arrow shown on the roller 32a in FIG. 2. Carrier spikes are arranged on the sleeve along the lines of magnetic force of the magnet roller to hold the toner and transfer it onto the photosensitive dram 30 at the developing position where the photosensitive dram 30 and the development roller 32a face each other under the effect of the electric field produced by the developing bias voltage and the surface potential of the photosensitive dram 30.

A number of paper feeding cassettes 40 are arranged on the bottom of the main body 1 to contain sheets of copying paper with different respective sizes, which sheets operate as so many image forming media. As will be described in greater detail hereinafter, when the copy key arranged on a control panel 123 is depressed, the original size sensor (not shown) detects the size of the original and selects the corresponding one of the paper feeding cassettes 40 so that the sheets of paper in the cassette is taken out on a one-by-one basis. Then, the sheet of copying paper is then fed to an aligning roller 42 by means of a transfer roller 41, where it waits for the photosensitive dram 30 until the latter is set in position.

The aligning roller 42 corrects any displacement of the sheet and aligns the front end of the copying sheet with that of the toner image on the photosensitive dram 30 before it feeds the copying sheet at a rate corresponding to the moving speed of the outer peripheral surface of the photosensitive dram 30. An alignment switch (not shown) is arranged near the aligning roller 42 for detecting the front end of the copying sheet and controlling the timing of the operation of the aligning roller 42.

The transfer charger 33 applies a high voltage fed from a transfer high voltage transformer (not shown) to the copying sheet provided from the aligning roller 42 in synchronism with the rotary motion of the photosensitive dram 30 in order to transfer the visual (toner) image on the photosensitive dram 30 onto the copying sheet.

The peeling charger 34 applies a high voltage fed from a peeling high voltage transformer (not shown) to the copying sheet by means of a corona wire in order to peel the copying sheet off the photosensitive dram 30.

The peeling claw 35 assists the operation of the peeling charger 34 for peeling the copying sheet.

The cleaner 37 scrapes off the untransferred toner remaining on the surface of the photosensitive dram 30 and collects it. The collected toner is stored in a toner collector (not shown) and disposed as waste when it gets to a certain volume.

The deelectrification lamp 38 removes any residual electric potential on the photosensitive dram 30 by emitting light onto the dram 30 under the effect of the voltage fed from a power source driver (not shown).

The copying sheet peeled off by said peeling charger 34 is then fed to a fixing unit (heat roller) 44 by means of a conveyor belt 43. The fixing unit 44 makes the visual image transferred onto the copying sheet to be securely held on the latter by heating/fixing.

After the fixing operation, the copying sheet is moved onto a delivery tray 46 by means of a discharge roller 45. A discharge switch (not shown) is arranged near the discharge roller 45 to detect the rear end of the copying sheet and ensure that the operation of forming an image on the copying sheet is over.

Now, the control circuit of the embodiment of electronic copying machine will be described by referring to FIG. 3.

A main CPU (central processing unit) 111 is connected to a control panel CPU 112, a scanner CPU 113 and a printer CPU 114 by way of respective communication lines. Thus, the main CPU 111 controls the control panel CPU 112, the scanner CPU 113, the printer CPU 114 and hence the overall copying operation of the electronic copying machine.

The control panel CPU 112 is connected to a ROM (read-only memory) 121, a RAM (random access memory) 122 and a control panel 123 and operates for detecting the status of each of the switches (including a switch for selecting a magnification and a switch for selecting the size of copying sheets to be used) on the control panel 123 as well as that of each of the LEDs and various displays.

The scanner CPU 113 is connected to a ROM, 131, a RAM 132, a control section 133 for controlling a motor solenoid and mechanical components, an ADF (auto document feeder) 134, an editor (coordinate input device) 135, an A/D circuit (analog/digital conversion circuit) 137 for transforming analog image signals coming from the CCD sensor 14 typically into 8-bit image data, a shading correction (SHD) circuit 138 and a line memory 139. The control section 133 is connected to a pulse motor for driving the carriage 40 in the direction of auxiliary scanning. The scanner CPU 113 is also connected to an exposure lamp 11 by way of a lamp regulator 136.

The printer CPU 114 is connected to a control section 141 for controlling a motor solenoid switch and mechanical components, a RAM 142, a ROM 143, an LCF (large cassette feeder) 144, a sorter 145, a laser drive 147 for driving the laser unit 20 and a laser modulator 148.

The main CPU 111 is additionally connected to a ROM 151, a RAM 152, a buffer memory 153 for selecting the destination of the data read by a scanner 103 and the data to be sent to the printer engine and carrying out buffering operations, an image processing circuit 154 for processing image data, a compression/expansion circuit 155 for compressing and expanding image data, a compression memory 156 for storing the data compressed by the compression/expansion circuit 155, an I/F controller circuit 157 for interfacing a hard disc drive/optical disc drive/facsimile adapter, a display memory circuit 159 for storing the image data to be displayed on a display unit 158, a printer control circuit 161 for developing the code data transmitted from a personal computer 160 into image data, a page memory circuit 162 for storing image data for each page, a display font ROM 163 for developing code data on the display unit 158 and a print font ROM 164 for developing code data on the page memory circuit 164.

Figure 3:
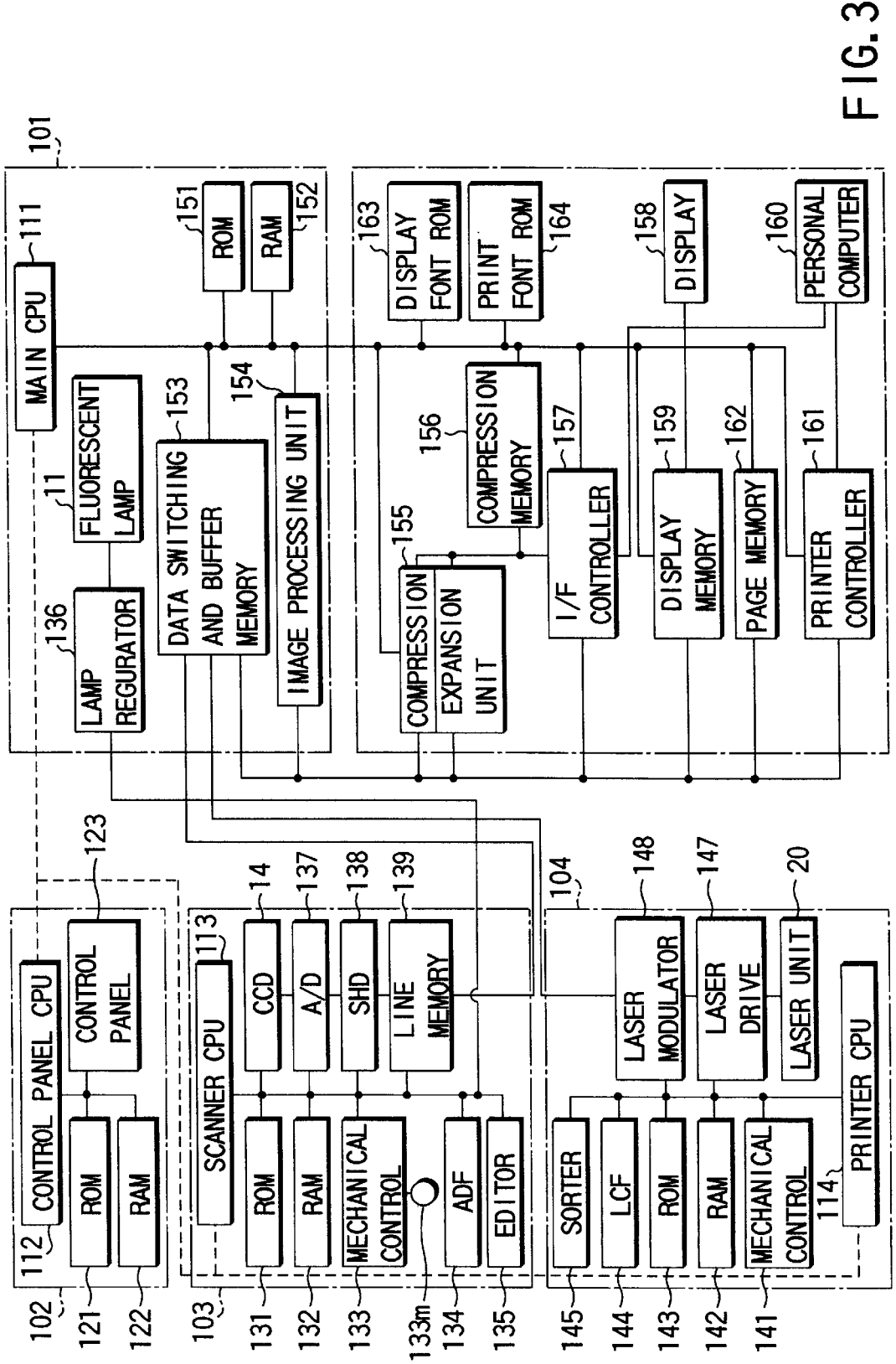
FIG. 3 is a block diagram of the control circuit of the apparatus of FIG. 2.

In FIG. 3, 101 denotes a basic processing section and 102 denotes a control panel, whereas 103 and 104 respectively denote a scanner section and a printer engine.

A smoothing circuit 154a according to the invention is arranged in the image processing circuit 154 of the control circuit having a configuration as described above.

The smoothing circuits comprises a matrix forming section 201, a profile spot extracting section 202, an image region determining section 205, a smoothing section 206, an island-like region discriminating section 207 and an image data switching section 208. The profile spot extracting section 202 by turn comprises a template circuit 203 and a coordinate value output circuit 204.

Figure 4:
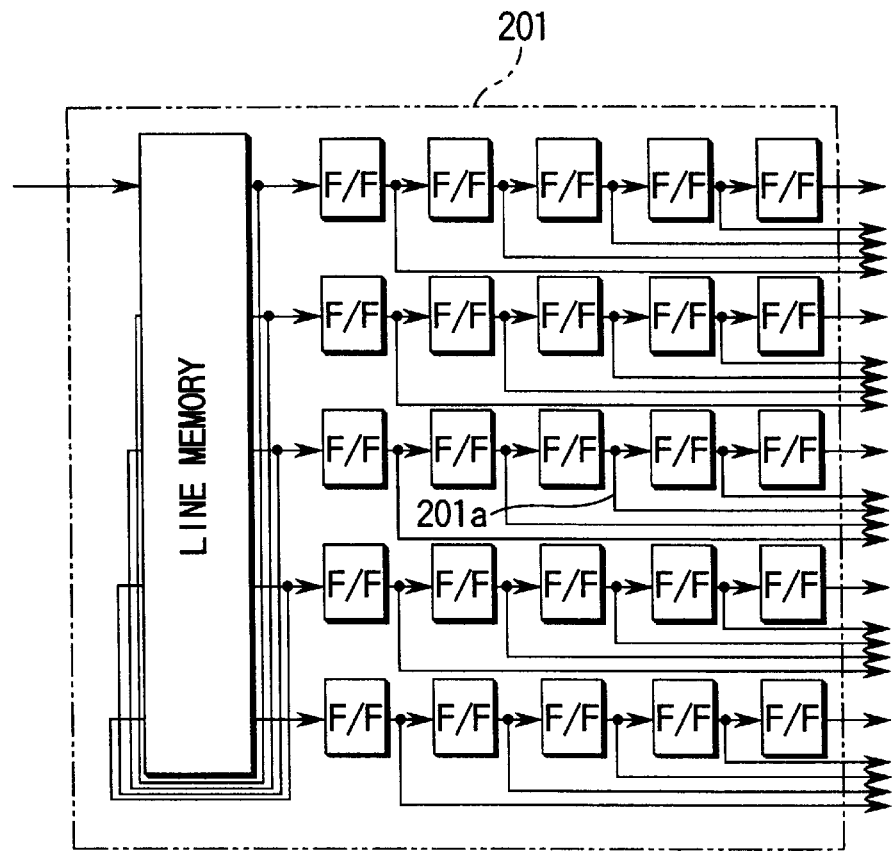
FIG. 4 is a block diagram of the matrix forming circuit of the embodiment of FIG. 1.

Referring to FIG. 4, the matrix forming section 201 comprises line memories for five lines and a plurality of flipflop (F/F) circuits arranged in the form of a matrix so that it forms a matrix of mxn pixels out of a predetermined number (i×j) of input image data. The pixel matrix is shifted bit by bit in the scanning direction and referenced by a down stream circuit as sampled image data. The pixel located at the center of the sampled image data is specified to be an attention-attracting pixel 201a.

Figure 5:
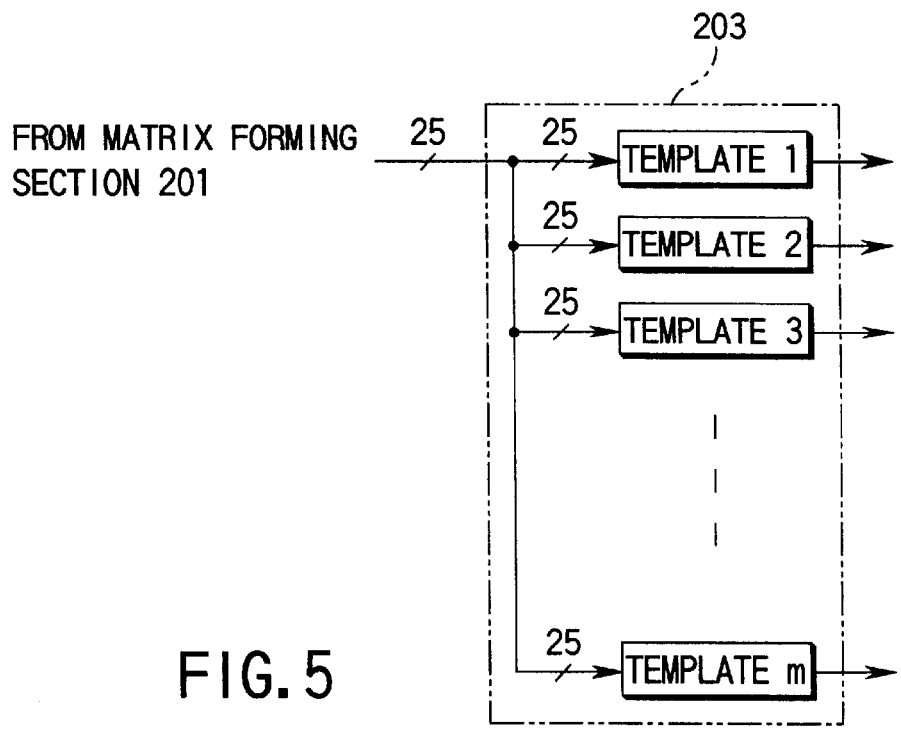
FIG. 5 is a block diagram of the template circuit of the embodiment of FIG. 1.
Figures 6, 7:
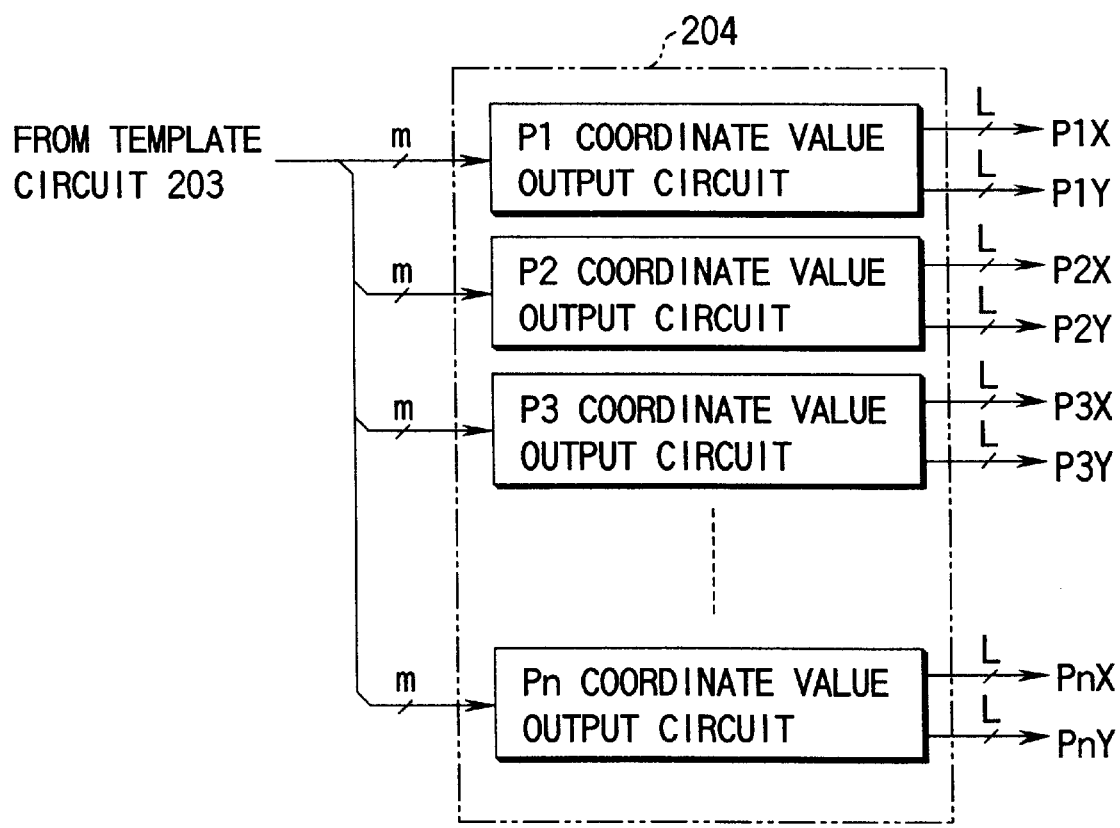
FIG. 6 shows an example of a template.
FIG. 7 is a block diagram of the coordinate value output circuit of the embodiment of FIG. 1.

As shown in FIG. 5, the template circuit 203 has a number of templates (1, 2, . . . , m: m is 64 for example) different from each other as look-up table, each of which is connected to the output of the matrix forming section 201 shown in FIG. 4. The template circuit 203 compares the image data of each template with the sampled image data transmitted from the matrix forming section for pattern matching. The template outputs "1" when the match with each other, whereas it outputs "0" when they do not match with each other. FIG. 6 shows a typical template (template k) that can be used for the purpose of the invention. The template k outputs "1" when it receives a data indicated by, e.g., in FIG. 14. Note that, since only one of the templates shows a matching, only that template outputs "1" as output signal.

Referring now to FIG. 7, the coordinate value output circuit 204 includes P1 through Pn coordinate value output circuits, each of which is connected to the (m-bit) output of the template circuit 203 of FIG. 5. The coordinate value output circuit 204 operates as means for detecting the profile of a black image component when the sampled image data is found to match with any of the template image data stored in the template circuit 203 and detects the X-Y coordinate values (P1X, P1Y), (P2X, P2Y), . . . , (PnX, PnY) of the pixels (profile spots P1, P2, . . . , Pn0) of the profile, which are then transmitted for a smoothing operation. The center of each of the pixels of the profile is referred to the profile point of the pixel. Here, n corresponds to the number of pixels arranged along a side of the matrix and will be equal to n=5 in this embodiment because the matrix has 5×5 pixels.

Figure 8:
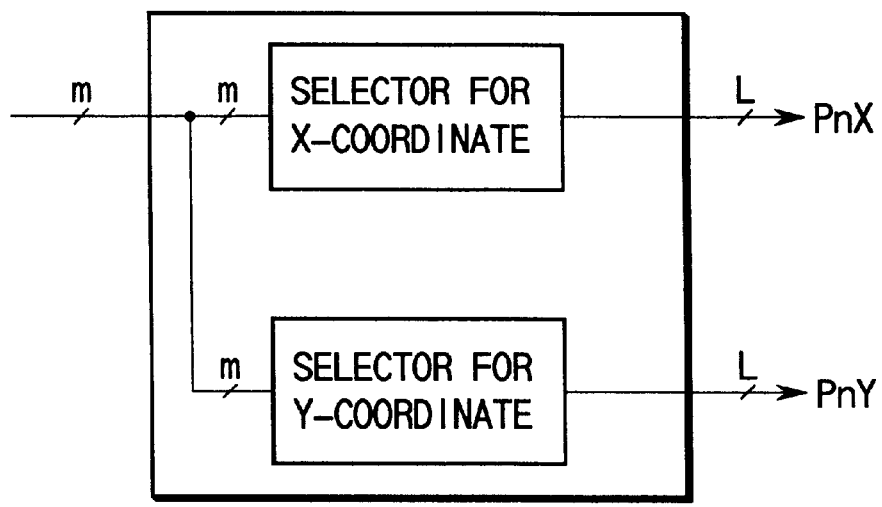
FIG. 8 shows an example of a Pn coordinate value output circuit.

FIG. 8 shows an exemplary Pn coordinate value output circuit. The selectors for the X-coordinate and the Y-coordinate are realized in the form of a table and adapted to output a L-bit signal in correspondence to an m-bit input pattern. The L-bit signal satisfies the relationship below.

$$2^{(L-1)} \leq \text{e.g., } n < 2^L$$

Figures 14, 15:
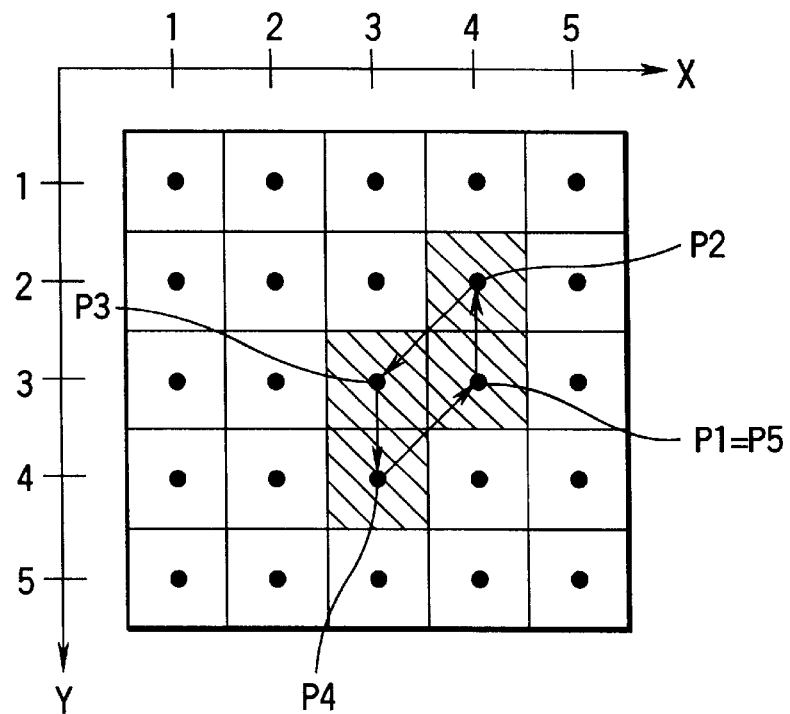
FIG. 14 is a schematic illustration of another example of sampled image data of the embodiment of FIG. 1.
FIG. 15 is a chart schematically illustrating the operation of the data switching section of the embodiment of FIG. 1.

For example, if there are 5×5 matrix data as in the case of this embodiment, a 3-bit signal will be output because of n=5 as described above. In the example of FIG. 14, which will be described hereinafter, P1 will output P1X=4 and P1X=3, P2 will output P2X=4 and P2Y=2 and P3 will output P3X=3 and P3Y=3, whereas P4 will output P4X=3 and P4Y=4 and P5 will output P5X=4 and P5Y=3.

Figure 1:
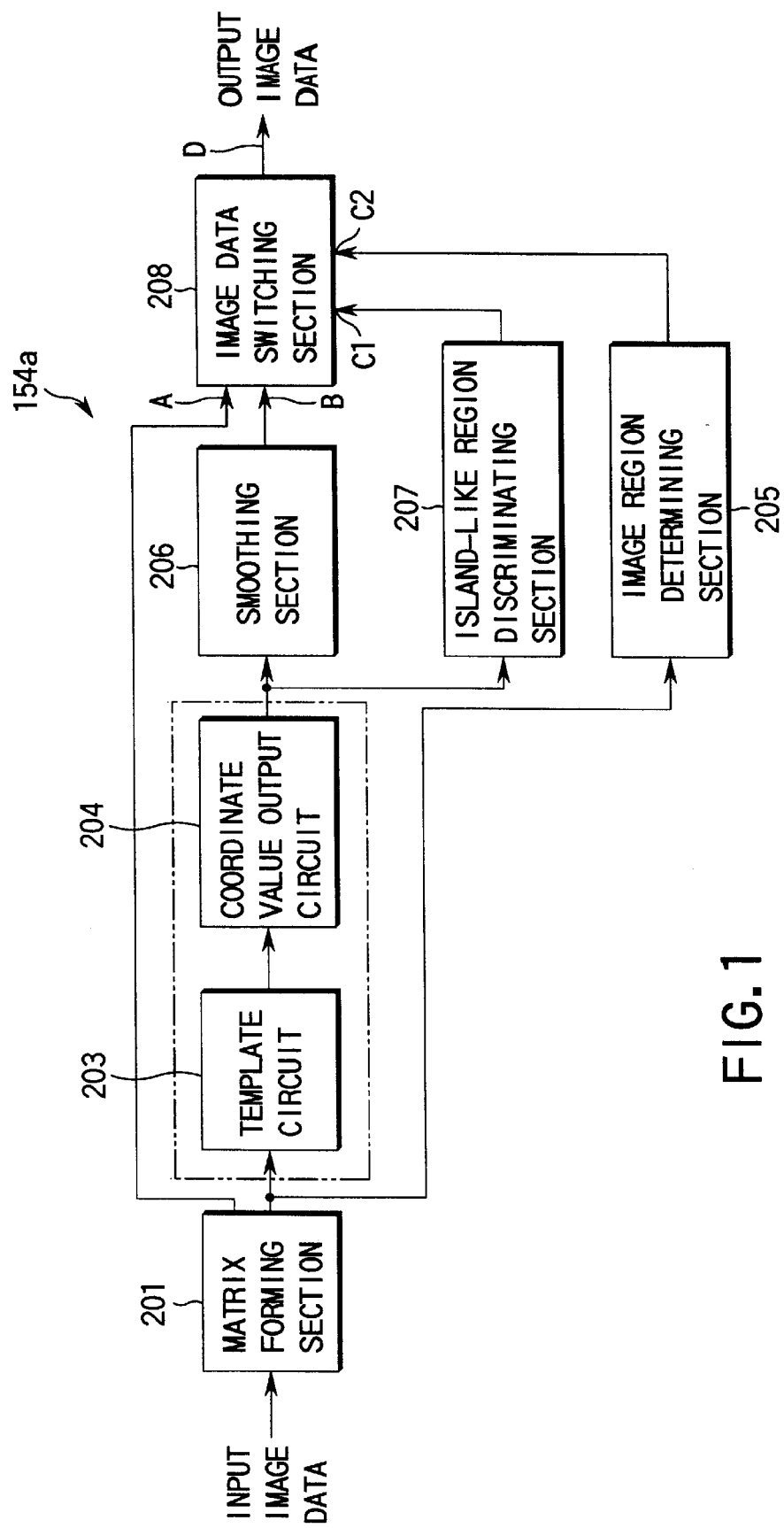
FIG. 1 is a block diagram of the smoothing circuit of an embodiment of image processing apparatus according to the invention.

The image region determining section 205 of FIG. 1 detects if the sampled image data of the matrix forming section 201 represents a character region or a photograph region (discrimination result C2).

The smoothing section 206 adds data for black pixels or those for white pixels to the profile of the black image on the basis of the X-Y coordinate values of the black image component transmitted from the coordinate value output circuit 204 to smooth out the profile by eliminating jags.

Figure 9:
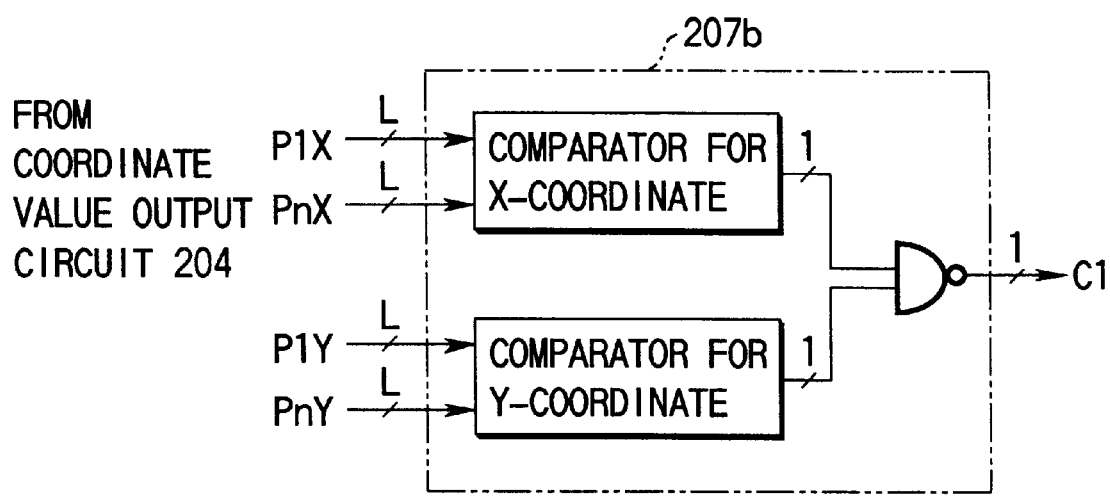
FIG. 9 is a block diagram of part of the island-like region discriminating section of the embodiment of FIG. 1.

The island-like region discriminating section 207 discriminates any specific regions such as island-like regions (spots in a picture) each formed by a set of black pixels fewer than a predetermined number contained in the sampled image data. The island-like region discriminating section 207 determines the coupled state of each profile spot. As shown in FIG. 9, the island-like region discriminating section 207 comprises a pair of comparators for the X-coordinate and the Y-coordinate and detects the coupled state, thus agreement or disagreement of the originating point and the terminating point, of each of the profile spots of the black image component produced by the coordinate value output circuit 204. The comparator outputs "1" when the inputs agree with each other, whereas it outputs "0" when they do not agree with each other. C1 will output "0" only when the both comparators output "1".

Figure 10:
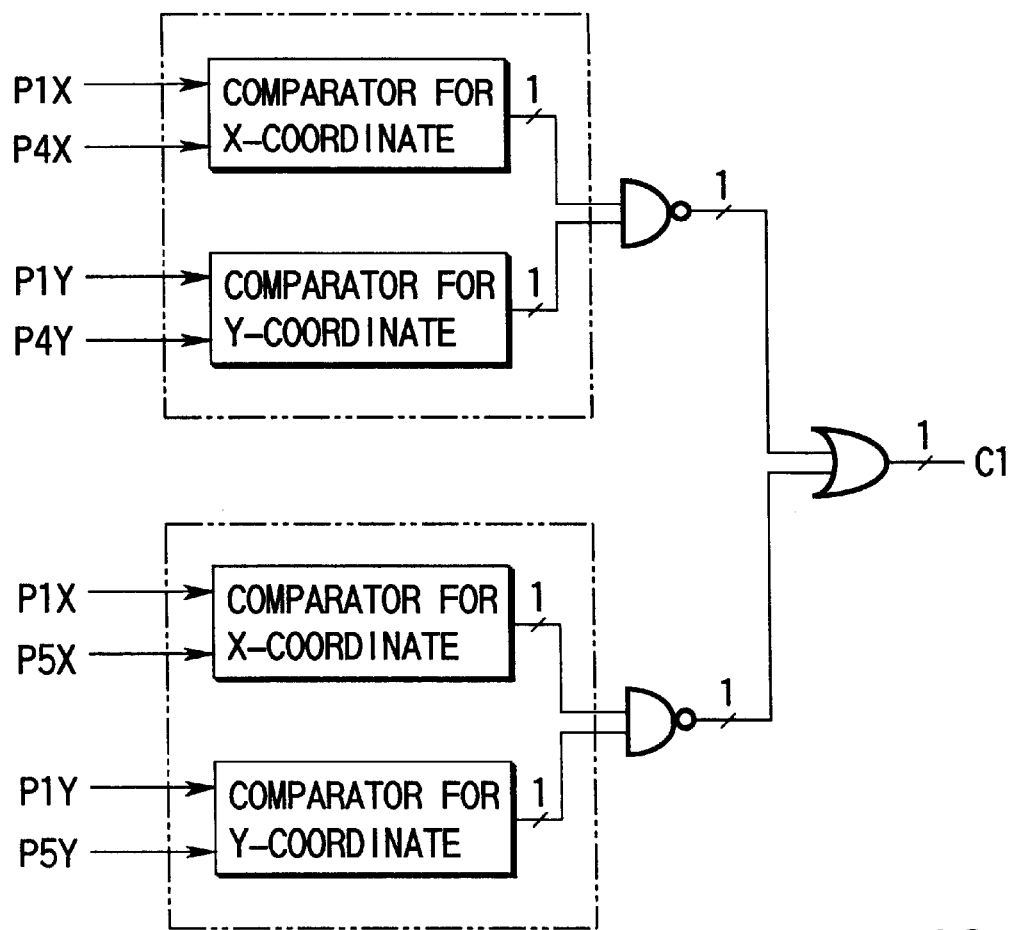
FIG. 10 is another block diagram of part of the island-like region discriminating section of FIG. 1.

When the condition of P1X=PnX and P1Y=PnY is met, island-like region discriminating section 207 indicates that a set of a given number of profile spots (e.g. 5) exists so that the set of black pixels is discriminated as an island-like region (discrimination result C1). Note that the given number is determined as a function of the size of the island-like region formed by an error propagation processing operation and the resolution of the scanner and hence not limited to 5 by any means. If it is desirable that both a set of four profile spots and that of five profile spots are discriminated as island-like regions, such a requirement can be met by arranging a plurality of coupled state determining sections as shown in FIG. 10.

Figure 11:
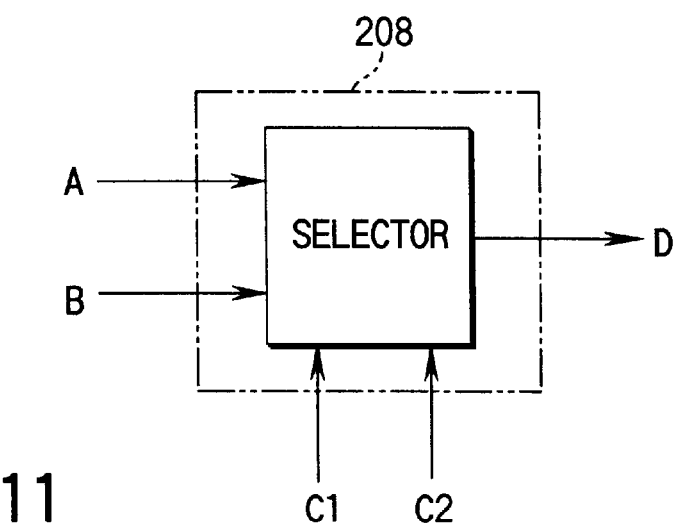
FIG. 11 is a block diagram of the image data switching section of the embodiment of FIG. 1.

As shown in FIG. 11, the image data switching section 208 comprises a selector and selectively produces as its output (output image data D) either the sampled image data A transmitted from the matrix forming section 201 or the image data B processed by the smoothing section 206 according to the discrimination results C1 and C2 of the island-like region discriminating section 207 and the image region determining section 205.

Figure 12:
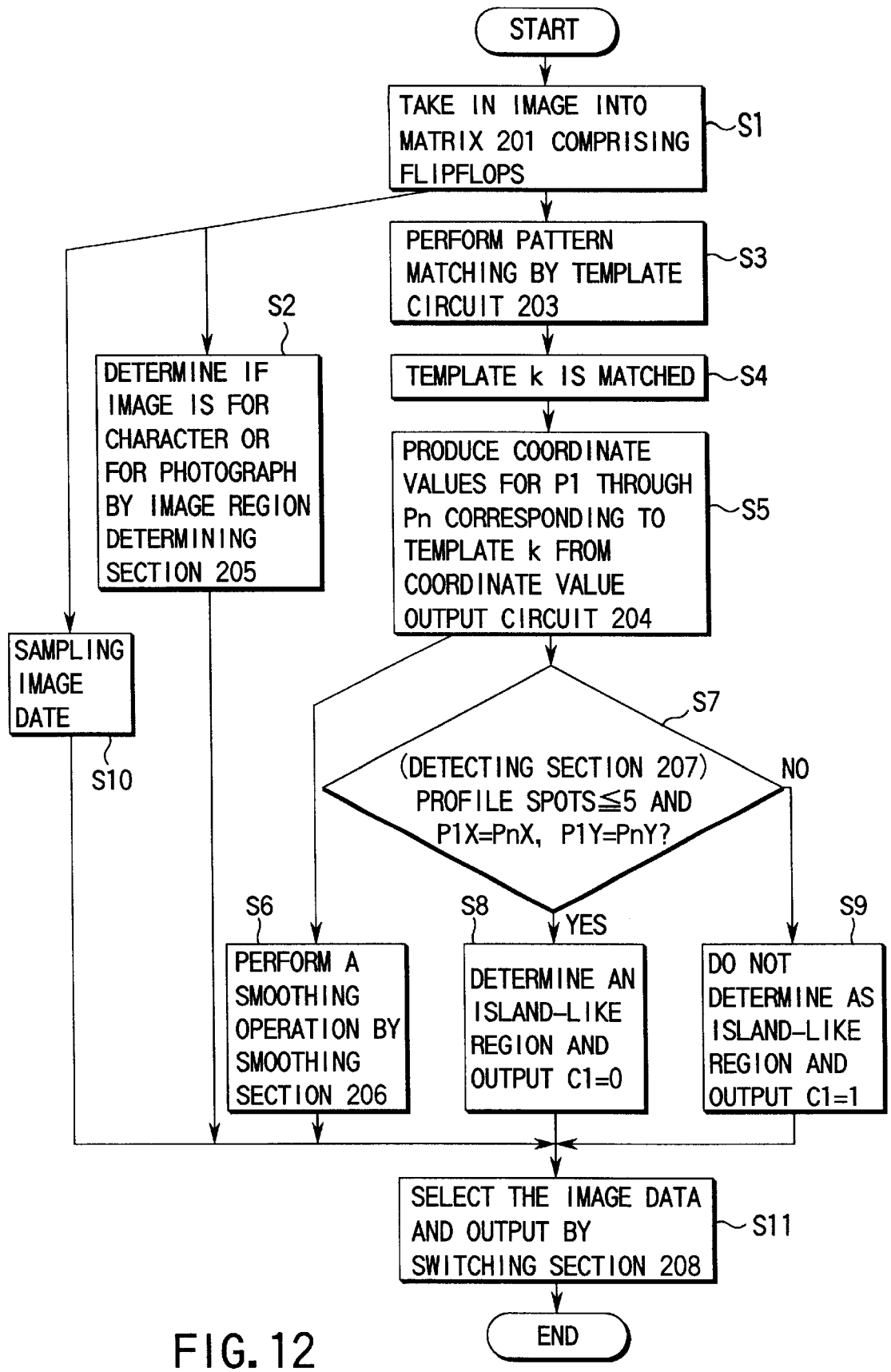
FIG. 12 is a flow chart illustrating the operation of the island-like region discriminating section of the embodiment of FIG. 1.

Now, the operation of the smoothing circuit 154a will be described by referring to FIG. 12.

An input image data is sent to the matrix forming section 201, which receives the data in such a way that it takes in a predetermined number of (i×j) pixels at a time and holds them as sampled image data (Step S1).

The sampled image data of the matrix forming section 201 is fed to the image region determining section 205, which discriminates character regions and photograph regions in the sampled image data (Step S2). The outcome of this discriminating operation is supplied to the image data switching section 208.

The sampled image data of the matrix forming section 201 is also fed to the image data switching section 208 (step S10) and the template circuit 203 where the sampled image data is compared with the data of each of the templates in the look-up table of the template circuit 203 (Step S3). If the sampled image data is found to match with the image data of any of the templates (e.g., that of template k) (step S4), the X-Y coordinate values P1X, P1Y, . . . , PnX, PnY of the n profile spots P1, P2, . . . , Pn of the black image component of the sampled image data are produced from the coordinate value output circuit 204 (Step S5).

As the X-Y coordinate values are produced from the coordinate value output circuit 204, the smoothing section 206 performs a smoothing operation according to the X-Y coordinate values it receives (Step S6). As a result, data for black pixels or those for white pixels are added to the profile of the black image on the basis of the X-Y coordinate values of the black image component transmitted from the coordinate value output circuit 204 to smooth out the profile by eliminating jags. The resultant image data is then sent to the image data switching section 208.

Meanwhile, the X-Y coordinate values transmitted from the coordinate value output circuit 204 are also fed to the island-like region discriminating section 207, which discriminates any island-like regions contained in the sampled image data on the basis of the X-Y coordinate values of the profile spots of the black image component transmitted from the coordinate value output circuit 204 (Steps S7 through S9).

Figure 13:
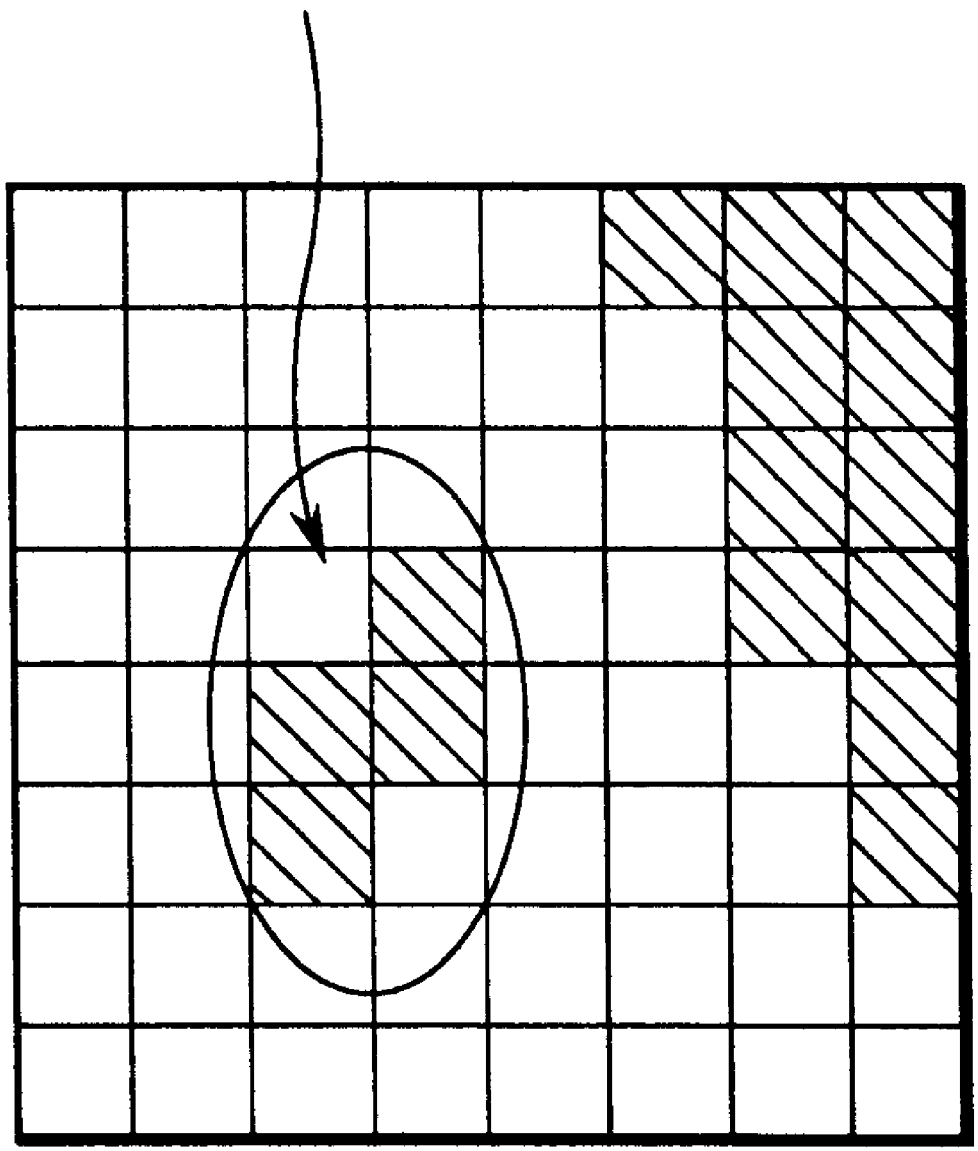
FIG. 13 is a schematic illustration of an example of sampled image data of the embodiment of FIG. 1.

FIG. 13 is a schematic illustration of an example of sampled image data containing an island-like region. A set of several black pixels surrounded by an ellipse and isolated from a group of black pixels represents an island-like region. The island-like region discriminating section 207 performs a processing operation as illustrated in FIG. 14 on the sampled image data.

The requirement that the originating point P1 and the terminating point P5 of a line linking the profile spots agree with each other is met. The profile spots represent respective spots of a loop line linking the set of black pixels.

P1(X=4, Y=3), P2(X=4, Y=2), P3(X=3, Y=3), P4(X=3, Y=4), P5(X=4, Y=3)

Thus, when the originating point and the terminating point of a line linking the profile spots agree with each other, the island-like region discriminating section 207 determines that the spots represent an island-like region. The outcome of the operation of the island-like region discriminating section 207 is fed to the image data switching section 208.

In FIG. 13, there is also a large group of black pixels separated from the island-like region. However, the originating point and the terminating point of a line linking the profile spots do not agree with each other so that the island-like region discriminating section 207 determines that the large group does not represent an island-like region.

The image data switching section 208 selects either the sampled image data A produced from the matrix forming section 201 or the image data B processed for smoothing by the smoothing section 206 according to the outcome of the operations of the image region determining section 205 and the island-like region discriminating section 207 as shown in FIG. 15 (Step S10).

For example, if the image region determining section 205 determines that a given region is a photograph region, the sampled image data A of the matrix forming section is selected as output regardless of the output of the discriminating operation of the island-like region discriminating section 207.

If, on the other hand, the image region determining section 205 determines that the given region is a character region and the outcome of the discriminating operation of the island-like region discriminating section 207 indicates that there is no island-like region, then the image data B processed by the smoothing section 206 is selected as output.

If the image region determining section 205 determines that the given region is a character region and the outcome of the discriminating operation of the island-like region discriminating section 207 indicates that one or more than one island-like regions exist, then the sampled image data A is selected as output.

If the image region determining section 205 mistakenly determines that a small island-like region in a photograph region is for a character or part thereof, undesired smoothing operation will be avoided because the island-like region discriminating section 207 discriminates one or more than one island-like regions. As a result, the intermediary gradations of an image processed for error propagation will not be damaged and any undesired degradation in the image quality of the photograph region(s) can be successfully avoided.

Figure 16:
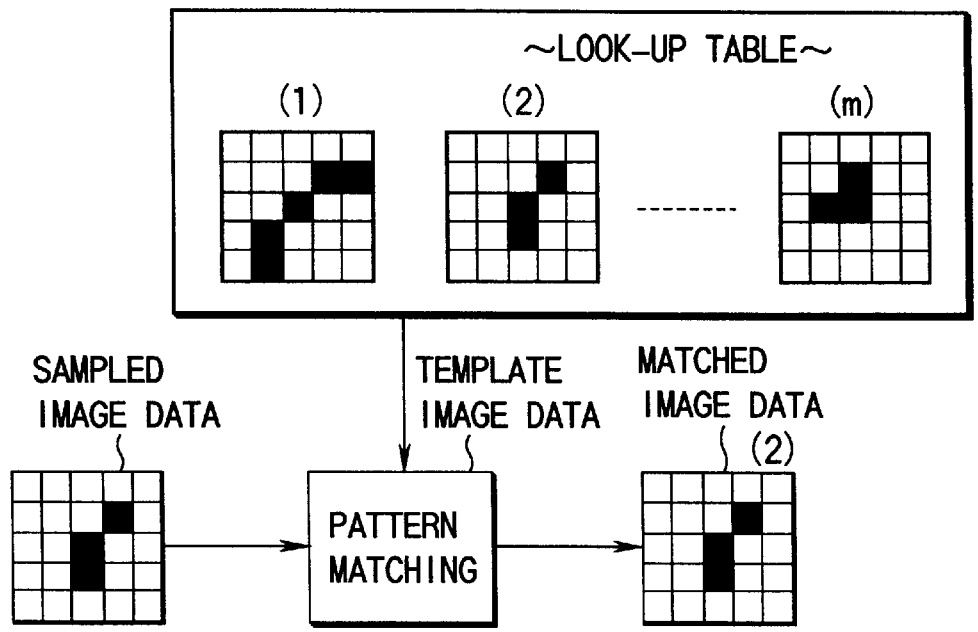
FIG. 16 is a schematic illustration of an example of pattern matching between sampled image data and template image data in the embodiment of FIG. 1.
Figure 17:
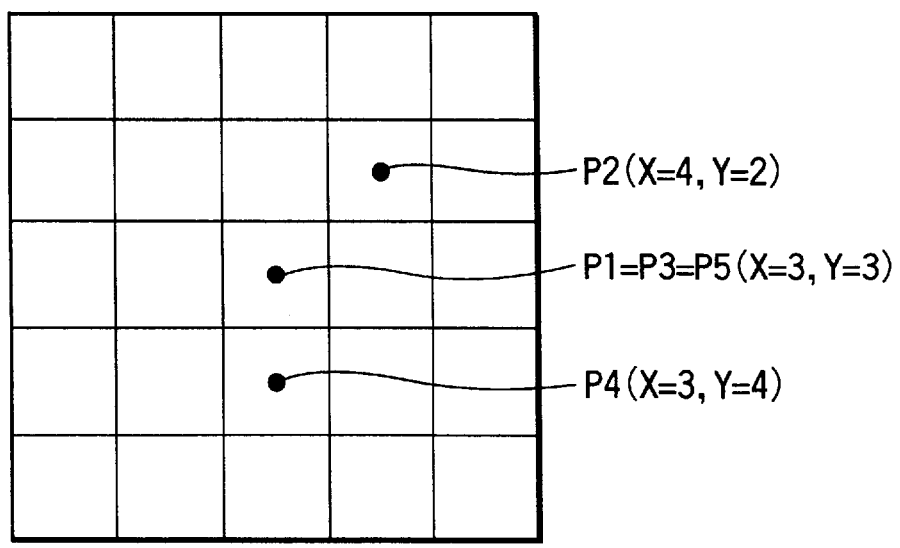
FIG. 17 is a chart schematically illustrating the correlations among profile spots for the pattern matching of FIG. 13.

FIG. 16 is a schematic illustration of an example of pattern matching between sampled image data and template image data in the embodiment of FIG. 1. FIG. 17 is a chart schematically illustrating the correlations among profile spots for the pattern matching of FIG. 16. As shown in FIG. 17, there is a set of profile spots P1, . . . , P5, the number of which does not exceed five and the originating point and the terminating point of the line linking the profile spots agree with each other.

P1(X=3, Y=3)=P3=P5, P2(X=4, Y=2), P4(X=3, Y=4)

Therefore, the island-like region discriminating section 207 determines that there is an island-like region.

Figure 18:
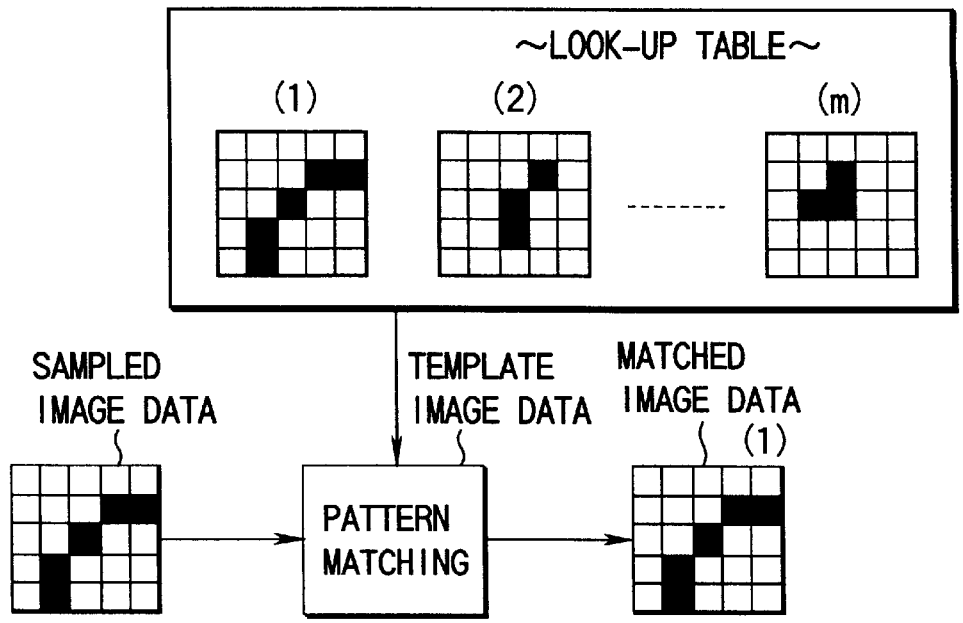
FIG. 18 is a schematic illustration of another example of pattern matching between sampled image data and template image data in the embodiment of FIG. 1.
Figure 19:
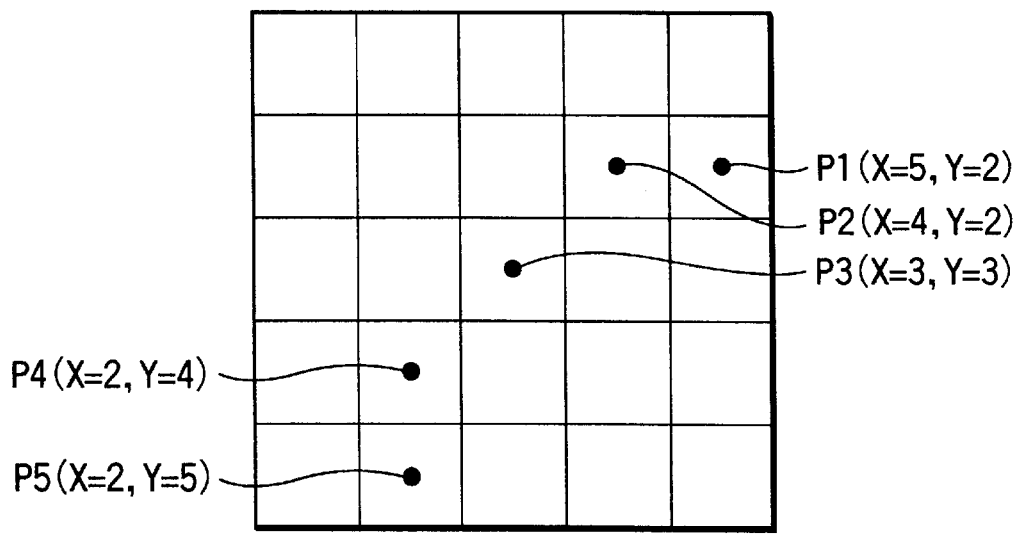
FIG. 19 is a chart schematically illustrating the correlations among profile spots for the pattern matching of FIG. 15.

FIG. 18 is a schematic illustration of another example of pattern matching between sampled image data and template image data in the embodiment of FIG. 1. FIG. 19 is a chart schematically illustrating the correlations among profile spots for the pattern matching of FIG. 18. As shown in FIG. 19, there is a set of profile spots P1, . . . , P5, the number of which does not exceed five but the originating point and the terminating point of the line linking the profile spots do not agree with each other.

P1(X=5, Y=2), P2(X=4, Y=2), P3(X=3, Y=3), P4(X=2, Y=4), P5(X=2, Y=5)

Therefore, the island-like region discriminating section 207 determines that there is no island-like region.

Figure 20:
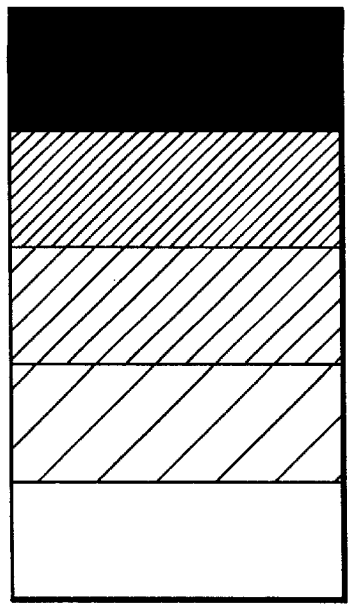
FIG. 20 is a schematic illustration of an exemplary photograph image having delicate gradations and processed by the embodiment of FIG. 1.
Figure 22:
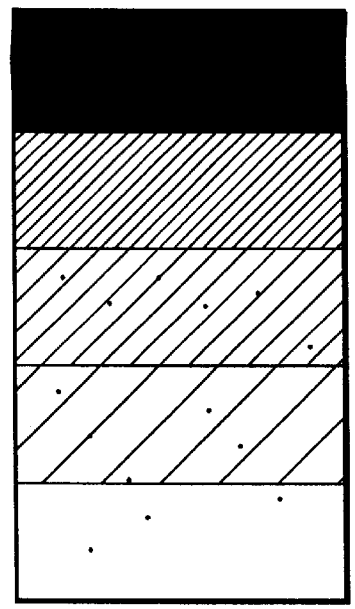
FIG. 22 is a schematic illustration of a spotted noise pattern having noise spots and produced on a photograph image processed by a known smoothing technique.
Figure 21:
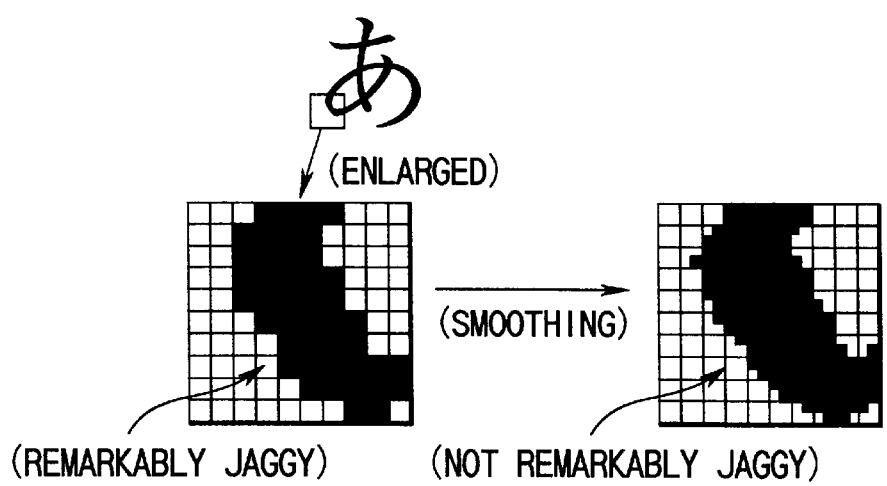
FIG. 21 is an exemplary image obtained by a known smoothing technique.
Figure 23:
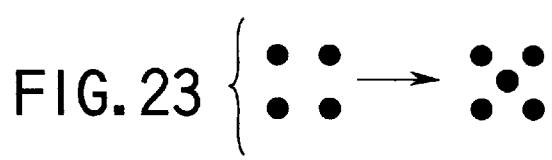
FIG. 23 is a schematic illustration showing how the spotted noise pattern of FIG. 22 is produced.

Thus, an island-like region is discriminated on the basis of the coordinate values of the profile spots contained in it and the result of the discriminating operation is used in combination with the result of an image region determining operation so that the intermediary gradations of an image processed for error propagation will not be adversely affected by the image processing operation. More specifically, no smoothing operation is conducted on an image having delicate intermediary gradations as shown in FIG. 20 so that an image free from a noise pattern of black spots as shown in FIG. 22 will be produced.

In other words, according to the invention, each image is examined if it contains one or more than one specific regions, each containing a set of pixels fewer than a predetermined number, on the basis of the correlations of the plurality of pixels constituting the profile of the image. Then, a smoothing operation is allowed or prohibited according to the result of the examination. Therefore, an undesired smoothing operation is prevented from being performed on photograph region(s) of an image to eliminate the risk of damaging the quality of the image. Thus, there is provided an image processing apparatus and method that can reliably prevent a smoothing operation from being performed on photograph(s) of an image to eliminate the risk of damaging the quality of the image.

While the threshold value for the number of pixels to be used for discriminating an island-like region is five in the above embodiment, the threshold value may be appropriately selected depending on the number of pixels in the sampled image data.

It may be appreciated to those skilled in the art that the present invention is not limited by any means to the above described embodiment, which may be modified in various ways without departing the spirit and the scope of the invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
    means for smoothing a profile of an image constituted by image data;
    means for discriminating a specific region containing a set of pixels fewer than a predetermined number in said image on a basis of the predetermined number and correlations of profile spots of the image constituting the profile;
    means for determining whether a smoothing operation is to be performed by using said smoothing means, in accordance with an outcome of the discriminating operation of said discriminating means;
    means for forming a pixel matrix by sequentially sampling input image data and providing the image data of the pixel matrix as sampled image data; and
    means for detecting the profile of a black image from said sampled image data provided by said matrix forming means, wherein;
        said discriminating means includes means for discriminating that an island-like region having a surface area smaller than a predetermined value exists in the sampled image data when the number of profile spots of the black image detected by said detecting means is smaller than a predetermined value; and
        said determining means includes image data switching means for selecting either the image data processed by said smoothing means or the sampled image data of said matrix forming means and producing the selected data as output.

2. An image processing apparatus according to claim 1, wherein
    said data switching means selects as output the image data processed by said smoothing means when said discriminating means discriminates no island-like region whereas it selects the sampled image data of said matrix forming means when said discriminating means discriminates said island-like region.

3. An image processing apparatus according to claim 1, wherein said detecting means further comprises:
    means for comparing the sampled image data provided by said matrix forming means with each of a plurality of template image data provided in advance for matching and, if they are matched with each other, provides a matched template number thereof; and
    means for providing the coordinate values of the profile spots constituting the profile of the matched image provided by said comparison means.

4. An image processing apparatus according to claim 1, further comprising:
    image region determining means for determining the sampled image data provided by said matrix forming means are for a character region or a photograph region, wherein
    said data switching means selects as output one of the image data processed by said smoothing means and sampled image data of said matrix forming means, according to the outcome of said discriminating means and said determining means.

5. An image processing apparatus according to claim 4, wherein
    said data switching means selects the image data processed by said smoothing means when said discriminating means discriminates no island-like region and said image region determining means determines the sampled image data are for a character region, whereas it otherwise selects the sampled image data provided by said matrix forming means.

6. An image processing apparatus comprising:
    means for smoothing a profile of an image constituted by image data;
    means for discriminating a specific region containing a set of pixels fewer than a predetermined number in said image on a basis of the predetermined number and correlations of profile spots of the image constituting the profile;
    means for determining whether a smoothing operation is to be performed by using said smoothing means, in accordance with an outcome of the discriminating operation of said discriminating means;
    matrix forming means for forming a pixel matrix by sequentially sampling input image data for a predetermined number of pixels and providing the image data of the pixel matrix as sampled image data; and
    means for detecting the profile of the black image from said sampled image data provided by said matrix forming means, wherein:
        said smoothing means includes means for adding black pixels or white pixels appropriately to the profile detected by said detecting means to provide an image showing a smooth profile;
        said discriminating means includes means for discriminating the existence of an island-like region having an area smaller than a predetermined value in the sampled image data when the number of profile spots of the profile of the black image detected by said detecting means is less than a predetermined value and the originating point and the terminating point of the line linking the profile spots match with each other; and
        said determining means includes image data switching means for selecting, as output, one of the image data processed by said smoothing means and the sampled image data of said matrix forming means, according to the outcome of the discriminating operation of said discriminating means.

7. An image processing apparatus according to claim 6, wherein said switching means has means for selecting as output the image data processed by said smoothing means when said discriminating means does not discriminate any island-like region and the sampled image data of said matrix forming means when the discriminating means discriminates the existence of an island-like region.

8. An image processing apparatus according to claim 6, wherein said detecting means further comprises:

means for comparing the sampled image data provided by said matrix forming means with each of a plurality of template image data having serial numbers and provided in advance for matching and, if they are matched with each other, provides a template number thereof; and means for providing the coordinate values of the profile spots constituting the profile of the matched image provided by said comparison means.

9. An image processing apparatus according to claim 6, further comprising:

means for determining the sampled image data provided by said matrix forming means are for a character region or a photograph region, wherein said data switching means selects as output one of the image data processed by said smoothing means and sampled image data of said matrix forming means, according to the outcome of said discriminating means and said determining means.

10. An image processing apparatus according to claim 9, wherein said data switching means selects the image data processed by said smoothing means when said discriminating means discriminates no island-like region and said image region determining means determines the sampled image data are for a character region, whereas it otherwise selects the sampled image data provided by said matrix forming means.

11. An image processing method comprising:

smoothing a profile of an image constituted by image data;

discriminating a specific region containing a set of pixels fewer than a predetermined number in said image on a basis of the number and correlations of the profile spots of the image constituting the profile;

determining whether a smoothing operation is to be performed, in accordance with an outcome of a discriminating operation of said discriminating step;

forming a pixel matrix by sequentially sampling input image data and providing the image data of the pixel matrix as sampled image data;

comparing the sampled image data provided by said matrix forming step with each of a plurality of template image data having serial numbers and provided in advance for matching and, if they are matched with each other, providing a template number thereof; and detecting the coordinate values of the profile spots of the profile of the matched image provided by said comparing step, wherein;

said smoothing step includes a step of adding black pixels or white pixels according to the profile detected by said detecting step to provide an image showing a smooth profile;

said discriminating step includes a step of discriminating the existence of an island-like region with an area smaller than a predetermined value in the sampled image data when the number of profile spots of the profile of the black image detected by said detecting step is less than a predetermined value and the originating point and the terminating point of the line linking the profile spots match with each other;

said determining step includes a step of determining whether the sampled image data provided by said matrix forming step are for a character region or a photograph region; and selecting the image processed by said smoothing step when any island-like region is not discriminated in said discriminating step and the sampled image data is determined for a character region by said determining step, and otherwise selecting the sampled image data provided by said matrix forming step.

12. An image processing apparatus that prevents unnecessary smoothing of a photographic region of an image, comprising:

a profile spot extracting circuit;

a smoothing circuit to smooth a profile of an image constituted by image data;

an island-like region discriminating section for discriminating a specific region containing a set of pixels fewer than a predetermined number in the image on a basis of the predetermined number and correlations of profile spots of the image constituting the profile;

a determining circuit to determine whether a smoothing operation is to be performed by using said smoothing circuit, in accordance with an outcome of the discriminating section;

a sampler to form a pixel matrix by sequentially sampling input image data and providing the image data of the pixel matrix as sampled image data; and a detector to detect the profile of a black image from said sampled image data provided by said sampler; and an image data switching section to selectively output image data on the basis of an outcome of processing by said island-like region discriminating section; wherein said discriminating circuit determines that an island-like region having a surface area smaller than a predetermined value exists in the sampled image data when the number of profile spots of the black image detected by said detector is smaller than a predetermined value.

* * * * *